Figure 1:
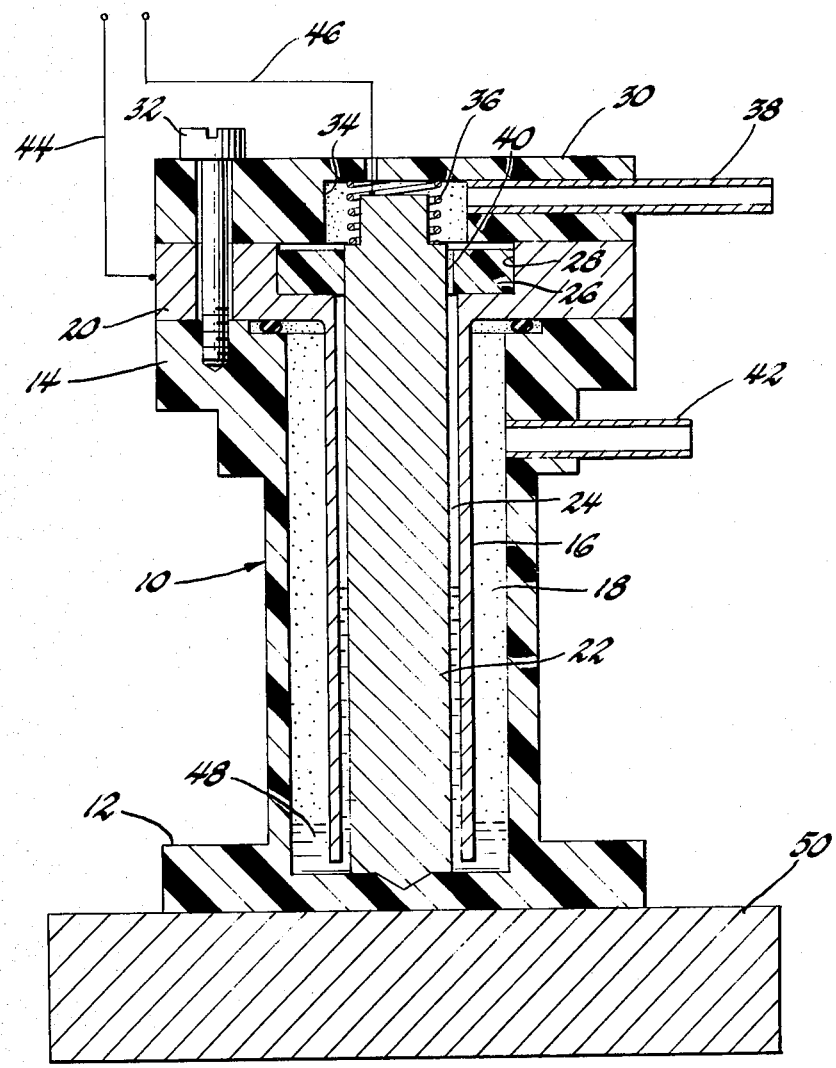

United States Patent [19]
Stoltman et al.

[11] Patent Number: 4,462,259
[45] Date of Patent: Jul. 31, 1984

[54] PRESSURE TRANSDUCER

[75] Inventors: Donald D. Stoltman, Henrietta; Edwin C. Storey, Rochester, both of N.Y.

[73] Assignee: General Motors Corporation, Detroit, Mich.

[21] Appl. No.: 470,137

[22] Filed: Feb. 28, 1983

[51] Int. Cl.³ .............................................. G01L 9/12
[52] U.S. Cl. ...................................... 73/749; 361/283
[58] Field of Search .................. 73/749, 752; 361/283

[56] References Cited
U.S. PATENT DOCUMENTS

| | | | |
|---|---|---|---|
| 2,703,876 | 3/1955 | Edmundson | 73/749 |
| 3,190,122 | 6/1965 | Edwards | 73/749 |
| 4,423,638 | 1/1984 | Tward | 73/749 |

Primary Examiner—Donald O. Woodiel
Attorney, Agent, or Firm—Warren D. Hill

[57] ABSTRACT

A pressure transducer of the manometer type comprises two interconnected columns of liquid with means for applying differential pressure across the columns. The liquid is a magnetic liquid and a magnetic field is impressed on the columns to attract the liquid by magnetic force to a reference position. The applied differential pressure acts counter to the magnetic force to shift the columns so that their difference in lengths reflects the pressure. By using capacitor plates to define the walls for the liquid columns and a magnetic liquid which is a dielectric, the capacitance between the plates is a function of the column lengths and therefore is a function of the applied differential pressure.

5 Claims, 2 Drawing Figures

U.S. Patent

Jul. 31, 1984

4,462,259

PRESSURE TRANSDUCER

This invention relates to a pressure transducer and particularly to a pressure transducer having a magnetic liquid in a magnetic field responding to changes in differential pressure.

It is often required to use pressure transducers to obtain electrical measurements proportional to or representing a pressure occurring in a fluid such as air. Such measurements are used not only for scientific measurements but also to obtain data for the control of industrial systems or control for machines. Many types of pressure transducers are known, however, they are mainly applicable to high pressure ranges. Manometer types of pressure sensors are useful for measurement of small pressure differentials, however, for making pressure measurements over a large range of pressures the traditional manometer becomes very large. It is desirable to obtain the sensitivity and the large pressure range of a manometer in an instrument of small dimension.

It is a general object of the invention, therefore, to provide a transducer for measuring small pressure differentials with the design potential of a large pressure range and having small dimensions. It is a further object to provide such an instrument not requiring a vertical orientation or a stable orientation.

The invention is carried out by providing in a magnetic field a slug of magnetic liquid in a passage such that the magnetic field biases the slug of liquid toward a reference position and pressure applied at ports in the passage displace the slug of liquid from a reference position against the force of the magnetic field, and an electrical sensor measuring the displacement of the slug for varying an electrical parameter representing the pressure differential across the slug. The invention further contemplates a passage shaped to provide two parallel columns of the magnetic liquid and a magnet positioned to equalize the column lengths in the absence of the pressure differential.

Figure 2:
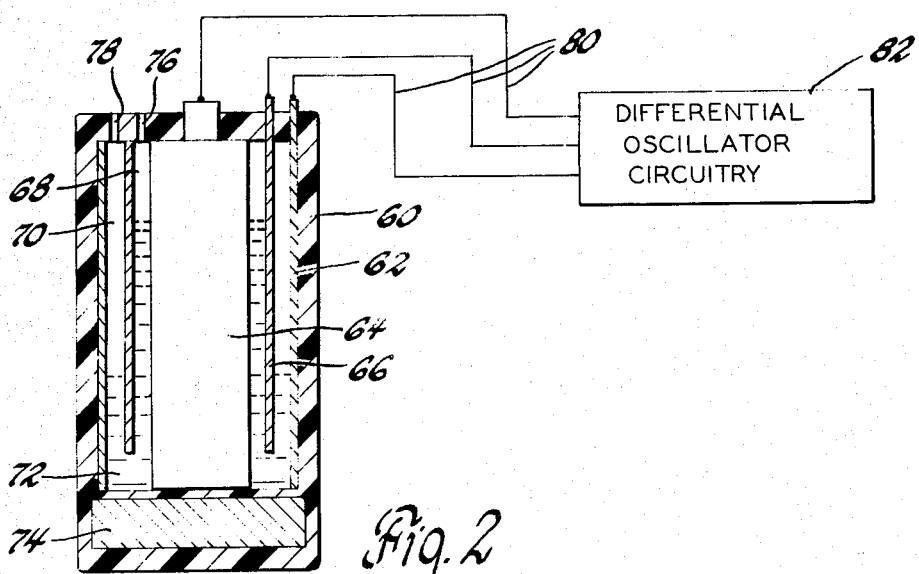

The above and other advantages of the invention will be made clear from the following description taken in conjunction with the accompanying drawings wherein:

FIG. 1 is a cross-sectional elevation of a pressure sensor according to the invention, and FIG. 2 is a cross-sectional elevation of another embodiment of a pressure sensor according to the invention.

The pressure sensor of FIG. 1 comprises a hollow cylindrical housing 10 of insulating material closed at one end which has a base flange 12 and open at the other end which has a flange 14. A metallic tubular sleeve 16 is disposed in the hollow housing 10 and is spaced from the inner wall thereof to form a first annular chamber 18 between the housing and the sleeve 16. One end of the sleeve 16 is slightly spaced from the closed end of the housing 10 while the other end of the sleeve has a flange 20 engaging and seating against the housing flange 14 thereby providing a support of the sleeve 16 within the housing. A conductive rod 22 within sleeve 16 and concentric therewith is spaced from the sleeve to form a second annular chamber 24. One end of the rod 22 is seated against the closed end of the housing while the other end extends beyond the flange 20 of the sleeve where it is centered by an annulus 26 of insulating material which in turn seats within a central bore 28 in the flange 20. An insulating cap 30 seats on the flange 20 and is secured by bolts 32 to the housing 10. The cap has a central inner recess 34 which receives an end of the rod 22 and a compression spring 36 which engages the inner surface of the recess and a shoulder on the rod 22 to hold the rod against the closed end of the housing 10. A port 38 extending through the side of the cap 30 communicates with the recess 34 and a passage 40 in the annulus 26 provides communication between the recess and the chamber 24 so that pressure applied to the port 38 is also applied to the chamber 24. Another port 42 in the side of the housing 10 near the flange 14 communicates directly with the chamber 18. External lead wires 44 and 46 connect to the sleeve 16 and the rod 22 respectively.

The chambers 18 and 24 contain a slug of magnetic liquid 48 which each chamber forms into a column, the two columns being interconnected by the space between the end of the sleeve 16 and the inner end surface of the housing 10. A magnet 50 seats against the flange 12 of the housing 10 to establish a magnetic field in a direction to attract the slug of magnetic liquid 48 toward the magnet so that in the absence of any applied pressure differential the two columns of liquid in the chambers 18 and 24, respectively, will be of equal lengths. When pressure differential is applied to the ports 38 and 42 the magnetic liquid will flow from one column to another so that the difference in column lengths represents the measure of the applied pressure differential. Thus the sensor is analogous to a conventional manometer which relies upon gravity to bias the column lengths toward equality, however the conventional manometer must be held with the columns in an upright position as dictated by the direction of gravitational force. In the sensor according to the invention, however, the magnetic liquid and the magnet strength are so selected that the force on the liquid is several times stronger than that which is due to gravity so that the sensor need not be restricted to any particular orientation. It can be utilized with the columns disposed horizontally or even "upside down" with respect to a conventional manometer setting.

The magnetic liquid, also called a ferrofluid, comprises an oil-like synthetic liquid called a diester or diester-based solvent used as a carrier in which particles of magnetite are suspended. The particles having a size of approximately 100 angstrom units are held in permanent suspension by the molecular motion of the diester medium. The magnetite particles provide the liquid with magnetic properties so that an externally imposed magnetic field will apply a force on the liquid.

This magnetic liquid is also a dielectric and the dielectric properties are used for the electrical measurement of the column length. The rod 22 and the concentric sleeve 16 spaced therefrom comprise two plates of a capacitor and the column of magnetic liquid is the dielectric medium between the plates which varies in extent according to the applied pressure differential so that the capacitance of the capacitor thus formed is dependent upon the applied pressure. The leads 44 and 46 are conveniently attached to circuitry for measuring the capacitance or for otherwise utilizing the pressure information.

By using a strong magnet and by optimizing the magnetic field by appropriate magnetic circuit design a given column length of the magnetic liquid can represent a pressure differential which is much larger than that ordinarily obtained by a conventional manometer. In other words a small instrument with a short column length can measure pressure ranges equivalent to that of much longer manometers. Moreover the source of the magnetic field is not limited to permanent magnets but electromagnets or solenoids are useful as well. In that case, the applied current can be adjusted to select a desired field strength to obtain a given pressure range for a particular instrument. In an instrument constructed according to the FIG. 1 configuration the gap between the rod 22 and the sleeve 16 is on the order of ½ to 1 mm and the maximum column length was about 45 mm so that throughout the range of the instrument the capacitance varied from 60 pF to 150 pF. This covered the pressure differential range of 0–90 mm of water. The gap between the housing 10 and the sleeve 16 is made large relative to the gap for the column being measured so that the level of liquid in chamber 18 has relatively small variation over the range of the instrument. In that case the column of liquid in the chamber 18 serves primarily as a reservoir supplying the liquid required for the measured column in the chamber 24.

Another embodiment of the invention as shown in FIG. 2 comprises a housing 60 of insulating material which is hollow and has on its inner surface a cylindrical metallic liner 62 and contains at its center a metallic rod 64 spaced from the liner 62. A cylindrical metallic sleeve 66 is spaced mid-way between the liner and the rod and spaced from an end of the housing thereby defining a pair of concentric chambers 68 and 70 of substantially equal volume. As in FIG. 1, a body of magnetic liquid 72 forms a pair of columns interconnected at one end of the sleeve 66 and a magnet 74 in one end of the housing provides a field for attracting the magnetic liquid toward the magnet. The chambers 68 and 70 are connected to pressure input ports 76 and 78, respectively. In this configuration the liner 62 and the sleeve 66 form one capacitor while the sleeve 66 and the rod 64 form a second capacitor, the liner 66, of course, being a common plate for both capacitors as well as forming a common wall for both chambers 68 and 70. As pressure is applied to the columns to shift the liquid from one chamber to another one capacitance increases while the other decreases. Conveniently, these two capacitors are connected by external leads 80 to differential oscillator circuitry 82. The two capacitors thus form two arms of a bridge arrangement to improve thermal stability and reduce the effects of component and material aging as well as decreasing sensitivity to electromagnetic interference.

While the preferred embodiments of the invention have been described herein, the principles of the invention apply to other configurations. The principle features are that a magnetic field is provided to maintain a body of magnetic liquid in a reference position when no pressure is applied and means for applying pressure differentials across the body of liquid to displace it by an amount depending on the magnitude of the pressure differential, and finally, means for electrically sensing the position of the body of liquid to provide an output signal representing the pressure differential. While a capacitive transducer has been described an inductive transducer may be used as well. That is, the inductance of a coil disposed around a column of magnetic liquid will vary according to the position of the magnetic liquid in the coil. Further, the configuration of the pressure transducer is not limited to the concentric annular columns as illustrated herein but may equally well be applied to a U-shaped manometer or indeed may apply to a straight tube disposed horizontally containing a slug of magnetic liquid, pressure input ports at each end, a solenoid disposed around the tube for applying a magnetic field which urges the slug of liquid toward the center of the solenoid, and an electrical sensor for measuring the displacement of the slug of liquid caused by applied pressure.

It will be apparent that the pressure transducer according to the invention uses the principles of the traditional manometer but has the advantage of smaller dimensions for a given pressure range and it is not limited to a particular orientation.

The embodiments of the invention in which an exclusive property or privilege is claimed are defined as follows:

1. A pressure transducer for altering an electrical parameter in response to differential pressure applied thereto, comprising:
 a housing having a passage therein,
 a pair of spaced pressure input ports in the passage,
 a slug of magnetic liquid in the passage between the input ports for movement along the passage in response to differential pressure applied to the input ports,
 means for establishing a magnetic field acting on the magnetic liquid to bias the slug of liquid toward a reference position whereby the displacement of the slug of liquid from the reference position is a measure of the pressure differential applied to the input ports, and
 an electrical sensor responsive to the displacement of the slug of liquid from the reference position for controlling an electrical parameter representing pressure differential.

2. A pressure transducer for altering an electrical parameter in response to differential pressure applied to input ports thereof, comprising:
 a manometer having two columns of liquid, the liquid comprising a magnetic liquid,
 a housing for containing the columns of liquid, and means interconnecting the columns for allowing liquid flow from one to another,
 means for establishing a magnetic field in the housing for attracting the liquid columns to a reference position for zero pressure differential,
 pressure input ports, one for each column, for applying a pressure differential across the columns of liquid for effecting liquid flow between the columns counter to the magnetic field attraction to cause a column length differential corresponding to pressure differential, and
 transducer means responsive to the length of at least one column for measuring pressure differential.

3. A pressure transducer for altering an electrical parameter in response to differential pressure applied to input ports thereof, comprising:
 a manometer having two parallel columns of liquid, the liquid comprising a magnetic liquid,
 a housing with chambers for containing the columns of liquid, passage means at one end of the housing interconnecting the chambers for allowing liquid flow from one chamber to another,
 magnet means in the housing for attracting the liquid toward that one end with a force greater than gravitational force tending to equalize column lengths,
 pressure input ports, one for each chamber, at the end of the housing opposite the said one end to allow a pressure differential to be applied to the columns of liquid for causing a column length differential corresponding to pressure differential, and capacitor plates in said housing forming, in conjunction with a column of liquid, a capacitor having a capacitance dependent on the applied pressure differential.

4. A pressure transducer for altering an electrical parameter in response to differential pressure applied to input ports thereof, comprising:
- a manometer having two parallel columns of liquid, the liquid comprising a magnetic liquid,
- a housing with chambers for containing the columns of liquid, passage means at one end of the housing interconnecting the chambers for allowing liquid flow from one chamber to another,
- magnet means in the housing for attracting the liquid toward that one end with a force greater than gravitational force tending to equalize column lengths,
- pressure input ports, one for each chamber, at the end of the housing opposite the said one end to allow a pressure differential to be applied to the columns of liquid for causing a column length differential corresponding to pressure differential, and
- the chambers being arranged concentrically thereby defining an inner and an outer chamber having a common wall, the common wall being conductive and comprising a first capacitor plate, and a conductive rod positioned in the inner chamber on the axis thereof and comprising a second capacitor plate, the two capacitor plates forming a capacitor responsive to the length of the column of liquid in the inner chamber, so that the capacitance is dependent on the applied pressure differential.

5. A pressure transducer for altering an electrical parameter in response to differential pressure applied to input ports thereof, comprising:
- a manometer having two parallel columns of liquid, the liquid comprising a magnetic liquid,
- a housing with chambers for containing the columns of liquid, passage means at one end of the housing interconnecting the chambers for allowing liquid flow from one chamber to another,
- magnet means in the housing for attracting the liquid toward that one end with a force greater than gravitational force tending to equalize column lengths,
- pressure input ports, one for each chamber, at the end of the housing opposite the said one end to allow a pressure differential to be applied to the columns of liquid for causing a column length differential corresponding to pressure differential,
- the chambers being arranged concentrically thereby defining an inner and an outer chamber having a common wall, the common wall being conductive and comprising a first capacitor plate, and a conductive rod positioned in the inner chamber on the axis thereof and comprising a second capacitor plate, the two capacitor plates forming a capacitor responsive to the length of the column of liquid in the inner chamber, so that the capacitance is dependent on the applied pressure differential, and
- the outer chamber having a conductive outer wall comprising a third capacitor plate concentric with the common wall, the first and third capacitor plates forming a second capacitor responsive to the length of the column of liquid in the outer chamber.

* * * * *